United States Patent
Rosenberg

(10) Patent No.: US 7,453,813 B2
(45) Date of Patent: Nov. 18, 2008

(54) METHODS FOR CONSTRUCTING PNNI NETWORKS WITH OPTIMIZED ARCHITECTURE

(75) Inventor: Eric Rosenberg, Lincroft, NJ (US)

(73) Assignee: AT&T Corp., New York, NY (US)

( * ) Notice: Subject to any disclaimer, the term of this patent is extended or adjusted under 35 U.S.C. 154(b) by 595 days.

(21) Appl. No.: 10/918,913

(22) Filed: Aug. 16, 2004

(65) Prior Publication Data
US 2006/0034298 A1  Feb. 16, 2006

(51) Int. Cl.
*G01R 31/08* (2006.01)
*G06F 11/00* (2006.01)

(52) U.S. Cl. ............... 370/238.1; 370/395.2; 370/408; 709/222

(58) Field of Classification Search ................ 370/254, 370/255, 256, 257, 258, 400, 395.2, 238, 370/238.1; 709/222
See application file for complete search history.

(56) References Cited

U.S. PATENT DOCUMENTS

| | | | |
|---|---|---|---|
| 6,147,971 A * | 11/2000 | Rochberger et al. ......... 370/238 |
| 6,606,303 B1 * | 8/2003 | Hassel et al. ................. 370/238 |
| 6,614,762 B1 * | 9/2003 | Illiadis et al. ............... 370/252 |
| 6,744,734 B1 * | 6/2004 | Iliadis et al. ............. 370/238.1 |
| 6,952,400 B1 * | 10/2005 | Kang et al. ................. 370/230 |
| 7,177,951 B1 * | 2/2007 | Dykeman et al. ........... 709/249 |
| 7,307,956 B2 * | 12/2007 | Kaplan et al. ............... 370/238 |
| 2001/0015958 A1 * | 8/2001 | Iliadis ........................ 370/238 |

OTHER PUBLICATIONS

Iladis, "Optimal PNNI complex node representations for restrictive costs and minimal path computation time", Aug. 2000, IEEE/ACM Transactions on networking, vol. 8, pp. 493-506.*
Illiadis et al,"PNNI clustering under node mobility in ATM networks", Nov. 12, 1998, IEEE GLOBECOM 1998, vol. 1, pp. 613-620.*

* cited by examiner

*Primary Examiner*—Hassan Kizou
*Assistant Examiner*—Mounir Moutaouakil
(74) *Attorney, Agent, or Firm*—P. V. D. Wilde

(57) ABSTRACT

The specification describes techniques for evaluating important network performance parameters, for example, call set-up time, for private network-to-network (PNNI) interfaces. These performance parameters are used to determine the optimum size of the peer groups in the PNNI network. Both flat and multi-level networks may be designed using the methods described.

2 Claims, 1 Drawing Sheet

METHODS FOR CONSTRUCTING PNNI NETWORKS WITH OPTIMIZED ARCHITECTURE

FIELD OF THE INVENTION

This invention relates to private network-to-network interfaces (PNNI), and more specifically to methods for constructing PNNI networks with optimized architecture.

BACKGROUND OF THE INVENTION

Private network-to-network interfaces (PNNI) refers to very large ATM networks that communicate between multiple private networks. A typical PNNI network is organized in peer groups. These are subunits of the total network that are interconnected as a group, with each group then interconnected in the PNNI network. An advantage of this architecture is that communications between members in a peer group can be independent of overall network management. When a communication between a node in one peer group and a node in another peer group is initiated, the PNNI protocol is used for that call set-up and management. The size of the peer groups, i.e. the number of nodes in each peer group, also affects the overall performance of the PNNI network.

Depending on the number of nodes served by the PNNI network, the architecture may be flat (non-hierarchical) or may have two or more hierarchical levels. When the network topology moves to multiple level architecture, several new effects on network performance are introduced. A primary motive for introducing new levels in a PNNI network is to increase routing efficiency and reduce call set-up time. However, added levels increase cost and management complexity. Thus there is an important trade-off when considering adding new hierarchical levels. A technique for resolving this trade-off is described and claimed in my co-pending application Ser. No. 10/346,460.

In both flat and multi-level networks, the size of the peer groups, i.e. the number of nodes in each peer group, affects the overall performance of the PNNI network. Thus the division of the network nodes into peer groups presents an important design variable that has not been generically solved previously in a rigorous fashion.

BRIEF STATEMENT OF THE INVENTION

According to the invention, a technique has been developed that evaluates important network performance parameters, for example, call set-up time, in terms of the peer group size. These are used to determine the optimum peer group size for a given PNNI network.

BRIEF DESCRIPTION OF THE DRAWING

The invention may be better understood when considered in conjunction with the drawing in which:

The FIGURE is a schematic diagram of a PNNI network showing a sample peer group configuration.

DETAILED DESCRIPTION OF THE INVENTION

Figure 1:
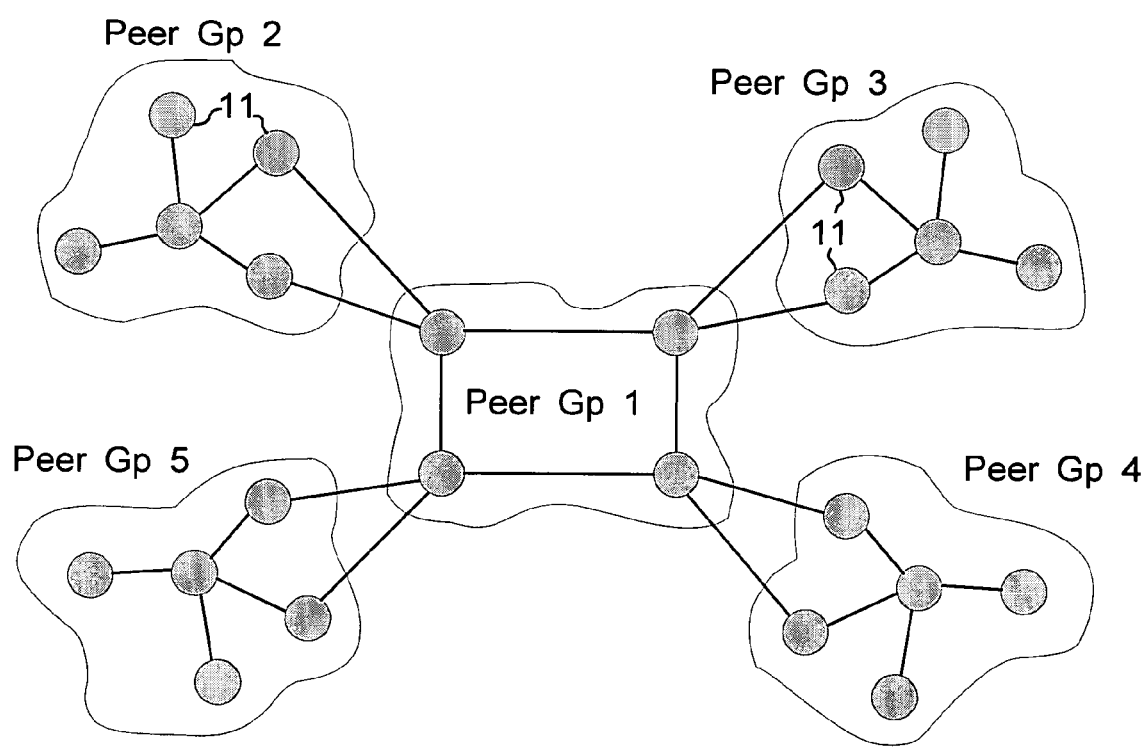

With reference to FIG. 1, a flat topological PNNI network is represented. These networks typically have many nodes. For simplicity, the illustration shows relatively few nodes 11, organized in peer groups as shown. The peer groups in the figure are illustrated as having five nodes per peer group. For the illustration, the peer group size is arbitrarily chosen. That design approach, more or less, typically with some empirical data or design experience, is used to determine the peer group size in conventional network designs. But a rigorous solution to the optimum peer group size, in terms of identifiably network performance parameters has not been available. The following section describes a rigorous approach to determining the optimum peer group size.

In the discussion that follows, let N be the total number of lowest-level nodes (i.e., the number of ATM switches). Let $x_1$ be the number of lowest-level nodes in each level-1 PG, and let $x_2 = N/x_1$ be the number of level-1 PGs (all variables are assumed to be continuous).

For a flat network, define $\mathcal{A} = \{\alpha | \alpha > 1\}$. We assume the time complexity of computing a minimum cost path in a flat (non-hierarchical) network with z nodes is $R_1(z) = \alpha_0 z^\alpha$, where $\alpha_0 > 0$ and $\alpha \in \mathcal{A}$. For example, for Dijkstra's shortest path method we have a $\alpha = 2$.

Certain nodes are identified as border nodes. A level-1 border node of a PG is a lowest-level node which is an endpoint of a trunk linking the PG to another level-1 PG. For example, if each U.S. state is a level-1 PG, and if there is a trunk from switch a in Chicago to switch b in Denver, then a and b are level-1 border nodes. Define $\Gamma = \{\gamma | 0 \leq \gamma < 1\}$. We assume the number of level-1 border nodes in a PG with $x_1$ lowest-level nodes is bounded above by $B_1(x_1) = \gamma_0 x_1^\gamma$, where $\gamma_0 > 0$ and $\gamma \in \Gamma$. The case where each PG has a constant number k of border nodes is modelled by choosing $\gamma_0 = k$ and $\gamma = 0$. The case where the border nodes are the (approximately $4\sqrt{x_1}$) boundary nodes of a square grid of $x_1$ switches is modelled by choosing $\gamma_0 = 4$ and $\gamma = \frac{1}{2}$.

Define $\mathcal{K} = \{\kappa | 0 \leq \kappa \leq 1\}$. We assume the total number of level-1 PGs, excluding the source level-1 PG, that the connection visits is bounded above by $V_1(x_2) = \kappa_0(x_2^\kappa - 1)$, where $\kappa_0 > 0$ and $\kappa \in \mathcal{K}$. Note that $V_1(1) = 0$, which means that in the degenerate case of exactly one level-1 PG, there are no PGs visited other than the source PG.

This functional form for $V_1(x_2)$ is chosen since the expected distance between two randomly chosen points in a square with side length L is kL, where k depends on the probability model used: using rectilinear distance, with points uniformly distributed over the square, we have $k = \frac{2}{3}$; using Euclidean distance we have $k = (\frac{1}{15})[2 + \sqrt{2} + 5 \log(\sqrt{2} + 1)] \approx 0.521$; with an isotropic probability model we have $k = [(2\sqrt{2}/(3\pi)] \log(1 + \sqrt{2}) \approx 0.264$. If the $x_2$ PGs are arranged in a square grid, a random connection will visit approximately $\kappa \sqrt{x_2}$ PGs. Choosing $\kappa_0 = k$ and $\kappa = \frac{1}{2}$, the total number of PGs visited is approximately $\kappa_0 x_2^\kappa$. Choosing $\kappa_0 = 1$ and $\kappa = 1$ models the worst case in which the path visits each level-1 PG.

The source node of a connection sees the $x_1$ nodes in the source PG, and at most $B_1(x_1)$ border nodes in each of the $x_2 - 1$ non-source PGs. A path computation is performed by the entry border node of at most $V_1(x_2)$ non-source PGs. In each non-source PG visited, the entry border node sees only the $x_1$ nodes in its PG when computing a path across the PG (or a path to the destination node, in the case of the destination PG), and so the path computation time complexity at each entry border node is $R_1(x_1)$. Hence the total path computation time is bounded above by $R_1(x_1 + (x_2-1)B_1(x_1)) + V_1(x_2)R_1(x_1) = \alpha_0[x_1 + (x_2-1)\gamma_0 x_1^\gamma]^\alpha + \kappa_0(x_2^\kappa - 1)\alpha_0 x_1^\alpha$. We ignore the constant factor $\alpha_0$. The optimization problem for a 2-level hierarchy is thus: minimize $[x_1 + (x_2-1)\gamma_0 x_1^\gamma]^\alpha + \kappa_0 x_1^\alpha (x_2^\kappa - 1)$ subject to $x_1 x_2 = N$.

We next transform this optimization problem to a convex optimization problem (which has a convex objection function, a convex feasible region, and any local minimum is also a global minimum. We approximate $x_2-1$ by $x_2$ and $x_2^\kappa-1$ by $x_2^\kappa$, yielding the objective function $[x_1+\gamma_0 x_1^\gamma x_2]^\alpha+\kappa_0 x_1^\alpha x_2^\kappa$, which also upper bounds the total path computation time. We rewrite the constraint $x_1 x_2=N$ as $N x_1^{-1} x_2^{-1}=1$, which can be replaced by $N x_1^{-1} x_2^{-1} \leq 1$, since the inequality must be satisfied as an equality at any solution of the optimization problem. Letting $y=x_1+\gamma_0 x_1^\gamma x_2$ yields the optimization problem: minimize $y^\alpha+\kappa_0 x_1^\alpha x_2^\kappa$ subject to $x_1+\gamma_0 x_1^\gamma x_2 \leq y$ and $N x_1^{-1} x_2^{-1} \leq 1$. The inequality constraint $x_1+\gamma_0 x_1^{\gamma x}_2 \leq y$ must be satisfied as an equality in any solution; we rewrite this constraint as $x_1 y^{-1}+\gamma_0 x_1^\gamma x_2 y^{-1} \leq 1$. Let $s_1=\log x_1$, $s_2=\log x_2$, $s=(s_1, s_2)$, and $t=\log y$. Combining exponential terms, we obtain the optimization problem $\mathcal{T}_2(N)$:

$$\text{minimize } f_2(s, t) = e^{\alpha t} + \kappa_0 e^{(\alpha s1 + \kappa s2)} \quad (1)$$

$$\text{subject to } e^{(s1-t)} + \gamma_0 e^{(\gamma s1+s2-t)} \leq 1; \quad (2)$$

$$N e^{(-s1-s2)} \leq 1. \quad (3)$$

Problem $\mathcal{T}_2(N)$ it is a special type of convex optimization problem called a geometric program. Geometric programs are particularly well suited to engineering design, with a rich duality theory permitting particularly efficient solution methods.

The following algorithm determines values for $s_1$ and $s_2$ that solve the optimization problem $\mathcal{T}_2(N)$. Thus, the algorithm determines the optimal $x_1$ (the optimal PG size) and the optimal $x_2$ (the optimal number of PGs).

Step 1. Choose any $\bar{s}=(\bar{s}_1, \bar{s}_2)$ such that $e^{\bar{s}_1} e^{\bar{s}_2}=N$, and choose $\bar{t}$ such that $e^{\bar{s}_1}+\gamma_0 e^{(\gamma \bar{s}_1+\bar{s}_2)}=e^{\bar{t}}$.

Step 2. Define $\epsilon_1=e^{\alpha \bar{t}}/f_2(\bar{s}, \bar{t})$ and $\epsilon_2=\kappa_0 e^{(\alpha \bar{s}_1+\kappa \bar{s}_2)}/f_2(\bar{s}, \bar{t})$.

Step 3. Define $\delta=(\delta_1, \delta_2, \delta_3, \delta_4)$ by $$\delta_1 = 1, \delta_2 = \frac{\epsilon_1 \alpha(1-\gamma) + \epsilon_2(\kappa - \alpha)}{2-\gamma}, \delta_3 = \epsilon_1 \alpha - \delta_2,$$

$$\delta_4 = \epsilon_1 \alpha + \epsilon_2 \kappa - \delta_2.$$

Step 4. Define $b_1=\log(N)$, $b_2=\log(\delta_2/(\epsilon_1 \alpha))$, and $b_3=\log(\delta_3/(\gamma_0 \epsilon_1 \alpha))$.

Define $(s, t)=(s_1, s_2, t)$ by $$s_1=(b_1+b_2-b_3)/(2-\gamma), s_2=b_1-s_1, t=s_1-b_2.$$

and $d=(s, t)-(\bar{s}, \bar{t})$.

Step 5. Use any well-known technique (e.g., bisection) to obtain a value $\theta^*$ solving the 1-dimensional optimization problem: minimize $\{f_2((\bar{s}, \bar{t})+\theta d)|0 \leq \theta \leq 1\}$. If $\theta^* \tau$ for some small positive stopping tolerance $\tau$, go to Step 6. Otherwise, set $(\bar{s}, \bar{t}) \leftarrow (\bar{s}, \bar{t})+\theta^* d$ and go to Step 2.

Step 6. The optimal PG size is $x_1^*=e^{\bar{s}_1}$ and the optimal number of PGs is $x_2^*=e^{\bar{s}_2}$. Stop.

For a three-level PNNI network, let $N$ be the total number of lowest-level nodes, let $x_1$ be the number of lowest-level nodes in each level-1 PG, $x_2$ be the number of level-1 PGs in each level-2 PG, and $x_3$ be the number of level-2 PGs. Thus $x_1 x_2 x_3=N$.

As for H=2, we assume the complexity of routing in a flat network with z lowest-level nodes is $R_1(z)=\alpha_0 z^\alpha$, where $\alpha_0>0$ and $\alpha \in \mathcal{A}$.

As for H=2, certain nodes are identified as border nodes. A level-1 border node of a PG in a 3-level network is a lowest-level node which is an endpoint of a trunk linking the PG to another level-1 PG within the same level-2 PG. A level-2 border node of a PG in a 3-level network is a lowest-level node which is an endpoint of a trunk linking the PG to another level-2 PG within the same PNNI network. For example, suppose each country in the world is a level-2 PG, and each U.S. state is a level-1 PG. Then if there is a trunk from a switch a in Boston to a switch b in London, a and b are level-2 border nodes.

For h=1, 2, we assume that the number of level-h border nodes in a level-h PG with z lowest-level nodes is bounded above by $B_h(z)=\gamma_0 z^\gamma$, where $\gamma_0>0$ and $\gamma \in \Gamma$. Thus each level-1 PG has at most $B_1(x_1)=\gamma_0 x_1^\gamma$ level-1 border nodes, and each level-2 PG has at most $B_2(x_1 x_2)=\gamma_0(x_1 x_2)^\gamma$ level-2 border nodes.

We assume that the total number of level-2 PGs, excluding the source level-2 PG, that the connection visits is bounded above by $V_2(x_3)=\kappa_o(x_3^\kappa 1)$, where $\kappa_0>0$ and $\kappa \in \mathcal{K}$. Note that $V_2(1)=0$, which means that in the degenerate case where there is one level-2 PG, there are no level-2 PGs visited other than the source level-2 PG. We assume that the total number of level-1 PGs visited within the source level-2 PG, excluding the source level-1 PG, is bounded above by $V_1(x_2)=\kappa_0(x_2^\kappa-1)$.

The source node sees the $x_1$ nodes in its level-1 PG, at most $B_1(x_1)$ level-1 border nodes in each of the $x_2-1$ level-1 PGs (excluding the source level-1 PG) in the same level-2 PG as the source, and at most $B_2(x_1 x_2)$ level-2 border nodes in each of the $x_3-1$ level-2 PGs (excluding the source level-2 PG) in the PNNI network. Thus the total number of nodes seen by the source is bounded above by $$x_1+(x_2-1)B_1(x_1)+(x_3-1)B_2(x_1 x_2)=x_1+(x_2-1)\gamma_0 x_1^\gamma+(x_3-1)\gamma_0(x_1 x_2)^\gamma.$$

The time complexity of the source path computation is bounded above by $$R_1(x_1+(x_2-1)B_1(x_1)+(x_3-1)B_2(x_1 x_2)).$$

The total path computation time for all the level-1 PGs in the source level-2 PG, excluding the source level-1 PG, is at most $V_1(x_2) R_1(x_1)$. For z>0, define $R_2(z)=\omega_0 z^\omega$. The total path computation time for each of the $V_2(x_3)$ level-2 PGs visited (other than the source level-2 PG) is, by definition, $f_2^*(x_1 x_2)$, which by Theorem 2 is bounded above by $R_2(x_1 x_2)$.

To minimize the upper bound on the total path computation time for a three-level net-work, we solve the optimization problem:

$$\text{minimize } R_1(x_1+(x_2-1)B_1(x_1)+(x_3-1)B_2(x_1 x_2))+V_1(x_2)$$
$$R_1(x_1)+V_2(x_3)R_2(x_1 x_2)$$

subject to $x_1 x_2 x_3=N$. We approximate $x_2-1$ by $x_2$, $x_3-1$ by $x_3$, $x_2^\kappa-1$ by $x_2^\kappa$, and $x_3^\kappa-1$ by $x_3^\kappa$, which preserves the upper bound. Introducing the variable y, we obtain the optimization problem: minimize $\alpha_0 y^\alpha+\kappa_0 x_2^\kappa \alpha_0 x_1^\alpha+\kappa_0 x_3^\kappa \omega_0(x_1 x_2)^\omega$ subject to $x_1+x_2 \gamma_0 x_1^\Gamma+x_3 \gamma_0+(x_1 x_2)^\gamma \leq y$ and $N x_1^{-1} x_2^{-1} x_3^{-1} \leq 1$. Letting $s_1=\log x_1$, $s_2=\log x_2$, $s_3=\log x_3$, $s=(s_1, s_2, s_3)$, and $t=\log y$, we obtain the geometric program $\mathcal{T}_3(N)$:

$$\text{minimize } f_3(s, t)=\alpha_0 e^{\alpha t}+\alpha_0 \kappa_0 e^{(\alpha s1+\kappa s2)}+\kappa_0 \omega_0 e^{(\omega(s1+s2)+\kappa s3)} \quad (4)$$

$$\text{subject to } e^{s1-t}+\gamma_0 e^{(\gamma s1 s2-t)}+\gamma_0 e^{(\gamma(s1+s2)+s3-t)} \leq 1 \quad (5)$$

$$N e^{(-s1-s2-s3)} \leq 1 \quad (6)$$

The following algorithm determines values for $s_1$, $s_2$, and $s_3$ that solve the optimization problem $\mathcal{T}_3(N)$. Thus, the algorithm determines the optimal $x_1$ (the optimal level-1 PG size), $x_2$ (the optimal number of level-1 PGs in each level-2 PG), and $x_3$ (the optimal number of level-2 PGs).

Step 1. Choose any $\bar{s}=(\bar{s}_1, \bar{s}_2, \bar{s}_3)$ such that $e^{\bar{s}_1}e^{\bar{s}_2}e^{\bar{s}_3}=N$, and choose $\bar{t}$ such that $$e^{\bar{s}_1}+\gamma_0 e^{(\gamma \bar{s}_1+\bar{s}_2)}+\gamma_0 e^{(\gamma(\bar{s}_1+\bar{s}_2)+\bar{s}_3)}=e^{\bar{t}}.$$

Step 2. Define $\epsilon_1=\alpha_0 e^{\alpha \bar{t}}/f_3(\bar{s}, \bar{t})$, $\epsilon_2=\alpha_0 \kappa_0 e^{(\alpha \bar{s}_1+\kappa \bar{s}_2)}/f_3(\bar{s}, \bar{t})$, and $\epsilon_3=\kappa_0 \omega_0 e^{(\omega(\bar{s}_1+\bar{s}_2)+\kappa \bar{s}_3)}/f_3(\bar{s}, \bar{t})$.

Define $(\alpha_1, \alpha_2, \alpha_3, \alpha_4)=(\epsilon_2\alpha+\epsilon_3\omega, \epsilon_2\kappa+\epsilon_3\omega, \epsilon_3\kappa, \epsilon_1\alpha)$.

Step 3. Define $\delta=(\delta_1, \delta_2, \delta_3, \delta_4, \delta_5)$ by $\delta_1=1$, $$\delta_3=[(1-\gamma)(\alpha_1+\alpha_4)+(\gamma-2)\alpha_2+\alpha_3]/(\gamma^2-3\gamma+3),$$

$$\delta_2=(1-\gamma)\delta_3+\alpha_2-\alpha_1, \delta_4=\alpha_4-\delta_2-\delta_3, \text{ and } \delta_5=\alpha_2+\delta_3+\gamma\delta_4.$$

Step 4. Define $\lambda=\delta_2+\delta_3+\delta_4$, and define $b_1=\log(N)$, $b_2=\log(\delta_2/\lambda)$, $b_3=\log(\delta_3/(\gamma_0\lambda))$, and $b_4=\log(\delta_4/(\gamma_0\lambda))$. Define $(s, t)=(s_1, s_2, s_3, t)$ by $$s_1=[b_1+b_2(2-\gamma)+b_3(\gamma-1)-b_4]/(\gamma^2-3\gamma+3), t=s_1-b_2,$$
$$s_2=b_3+t-\gamma s_1,$$

and $s_3=b_1-s_1-s_2$. Define $d=(s, t)-(\bar{s}, \bar{t})$.

Step 5. Use any well-known technique (e.g., bisection) to obtain a value $\theta^*$ solving the 1-dimensional optimization problem: minimize $\{f_3((\bar{s}, \bar{t})+\theta d) | 0\leq\theta\leq 1\}$. If $\theta^*<\tau$ for some small positive stopping tolerance $\tau$, go to Step 6. Otherwise, set $(\bar{s}, \bar{t})\leftarrow(\bar{s}, \bar{t})+\theta^* d$ and go to Step 2.

Step 6. The optimal level-1 PG size is $x_1^*=e^{\bar{s}_1}$, the optimal number of level-1 PGs in each level-2 PG is $x_2^*=e^{\bar{s}_2}$, and the optimal number of level-2 PGs is $x_3^*=e^{\bar{s}_3}$. Stop.

Various additional modifications of this invention will occur to those skilled in the art. All deviations from the specific teachings of this specification that basically rely on the principles and their equivalents through which the art has been advanced are properly considered within the scope of the invention as described and claimed.

The invention claimed is:

1. A method for constructing a two level private network-to-network interface (PNNI) network, the PNNI network comprising a plurality of nodes N, comprising dividing the nodes into a number of nodes $x_1^*$ interconnected in each level one peer group and a number $x_2^*$ of level one peer groups, and interconnecting the level one peer groups, wherein the number of nodes $x_1^*$ interconnected in each level one peer group is determined using the following steps:

(1) Set $\bar{s}=(\bar{s}_1, \bar{s}_2)$ such that $e^{\bar{s}_1}e^{\bar{s}_2}=N$, and set $\bar{t}$ such that $e^{\bar{s}_1}+\gamma_0 e^{(\gamma \bar{s}_1+\bar{s}_2)}=e^{\bar{t}}$, (2) set $f_2(\bar{s}, \bar{t})=e^{\alpha \bar{t}}+\kappa_0 e^{(\alpha \bar{s}_1+\kappa \bar{s}_2)}$, set $\epsilon_1=e^{\alpha \bar{t}}/f_2(\bar{s}, \bar{t})$ and $\epsilon_2=\kappa_0 e^{(\alpha \bar{s}_1+\kappa \bar{s}_2)}/f_2(\bar{s}, \bar{t})$, (3) define $\delta=(\delta_1, \delta_2, \delta_3, \delta_4)$ by $$\delta_1=1, \delta_2=\frac{\epsilon_1\alpha(1-\gamma)+\epsilon_2(\kappa-\alpha)}{2-\gamma}, \delta_3=\epsilon_1\alpha-\delta_2,$$

$$\delta_4=\epsilon_1\alpha+\epsilon_2\kappa-\delta_2,$$

(4) set $b_1=\log(N)$, $b_2=\log(\delta_2/(\delta_1\alpha))$, $b_3=\log(\delta_3/(\gamma_0\epsilon_1\alpha))$, define $(s, t)=(s_1, s_2, t)$ by $$s_1=(b_1+b_2-b_3)/(2-\gamma), s_2=b_1-s_1, t=s_1-b_2,$$

and set $d=(s, t)-(\bar{s}, \bar{t})$, (5) set $\theta^*$ to the point minimizing $f_2((\bar{s}, \bar{t})+\theta d)$ over the range $0\leq\theta\leq 1$, and set $(\bar{s}, \bar{t})\leftarrow(\bar{s}, \bar{t})+\theta^* d$, (6) set $x_1^*=e^{\bar{s}_1}$ and $x_2^*=e^{\bar{s}_2}$ where $\bar{S}_1$ represents the log of the number of nodes in each level one peer group, $\bar{S}_2$ represents the log of the level one peer groups, e is the numerical constant, N is the total given number of nodes in the network, $\alpha$ represents the time complexity of computing a minimum cost path in a flat network, $\gamma$ and $\gamma_0$ are constants characterizing the number of border nodes of each level one peer group, $\kappa$ and $\kappa_0$ characterize the number of lower level peer groups in each higher level peer group that is visited by a network connection, and $f_2, \epsilon_1, \epsilon_2, t, \bar{t}, d, b_1, b_2, b_3,$ and $\Theta$ are temporary variables.

2. A method for constructing a three level private network-to-network interface (PNNI) network, the PNNI network comprising a plurality of nodes N, comprising dividing the nodes into a number $x_1^*$ of lowest level nodes interconnected in each level one peer group, a number $x_2^*$ of level one peer groups in each level two peer group, and a number $x_3^*$ of level two peer groups, and interconnecting the level one peer groups and the level two peer groups, wherein the number $x_1^*$ of lowest level nodes interconnected in each level one peer group is determined using the following steps:

(1) Set $\bar{s}=(\bar{s}_1, \bar{s}_2, \bar{s}_3)$ such that $e^{\bar{s}_1}e^{\bar{s}_2}e^{\bar{s}_3}=N$, and set $\bar{t}$ such that $e^{\bar{s}_1}+\gamma_0 e^{(\gamma \bar{s}_1+\bar{s}_2)}+\gamma_0 e^{(\gamma(\bar{s}_1+\bar{s}_2)+\bar{s}_3)}=e^{\bar{t}}$, (2) set $f_3(\bar{s}, \bar{t})=\alpha_0 e^{\alpha \bar{t}}+\alpha_0\kappa_0 e^{(\alpha \bar{s}_1+\kappa \bar{s}_2)}+\kappa_0\omega_0 e^{(\omega(\bar{s}_1+\bar{s}_2)+\kappa \bar{s}_3)}$, set $\epsilon^1=\alpha_0 e^{\alpha \bar{t}}/f_3(\bar{s}, \bar{t})$, $\epsilon_2=\alpha_0\kappa_0 e^{(\alpha \bar{s}_1+\kappa \bar{s}_2)}/f_3(\bar{s}, \bar{t})$, $\epsilon_3=\kappa_0\omega_0 e^{(\omega(\bar{s}_1+\bar{s}_2)+\kappa \bar{s}_3)}/f_3(\bar{s}, \bar{t})$, set $(\alpha_1, \alpha_2, \alpha_3, \alpha_4)=(\epsilon_2\alpha+\epsilon_3\omega, \epsilon_2\kappa+\epsilon_3\omega, \epsilon_3\kappa, \epsilon_1\alpha)$, (3) define $\delta=(\delta_1, \delta_2, \delta_3, \delta_4, \delta_5)$ by $\delta_1=1, \delta_3=[(1-\gamma)(\alpha_1+\alpha_4)+(\gamma-2)\alpha_2+\alpha_3]/(\gamma^2-3\gamma+3)$, $\delta_2=(1-\gamma)\delta_3+\alpha_2-\alpha_1$, $\delta_4=\alpha_4-\delta_2-\delta_3$, and $\delta_5=\alpha_2+\delta_3+\gamma\delta_4$, (4) set $\pi=\delta_2+\delta_3+\delta_4$, and set $b_1=\log(N)$, $b_2=\log(\delta_2/\lambda)$, $b_3=\log(\delta_3/(\gamma_0\lambda))$, and $b_4=\log(\delta_4/(\gamma_0\lambda))$, define $(s, t)=(s_1, s_2, s_3, t)$ by $$s_1=[b_1+b_2(2-\gamma)+b_3(\gamma-1)-4]/(\gamma^2-3\gamma+3), t=s_1-b_2,$$
$$s_2=b_3+t-\gamma s_1,$$

and $s_3=b_1-s_1-s_2$, set $d=(s, t)-(\bar{s}, \bar{t})$ (5) set $\theta^*$ to the point minimizing $f_3((\bar{s}, \bar{t})+\theta d)$ over the range $0\leq\theta<1$, and set $(\bar{s}, \bar{t})\leftarrow(\bar{s}, \bar{t})+\theta^* d$, (6) set $x_1^*=e^{\bar{s}_1}$, $x_2^*=e^{\bar{s}_2}$ and $x_3=e^{\bar{s}_3}$, where $\bar{S}_1$ represents the log of the number of nodes in each level one peer group, $\bar{S}_2$ represents the log of the level one peer groups, $\bar{S}_3$ represents the log of the number of level two peer groups, i is the numerical constant, N is the total given number of nodes in the network, $\alpha$ represents the time complexity of computing a minimum cost path in a flat network, $\gamma$ and $\gamma_0$ are constants characterizing the number of border nodes of each level one peer group, $\kappa$ and $\kappa_0$ characterize the number of lower level peer groups in each higher level peer group that is visited by a network connection, and $f_3, \epsilon_1, \epsilon_2, t, \bar{t}, d, b_1, b_2, b_3, b_4, a_1$ to $a_4$ $a, \omega, \delta, \gamma,$ and $\Theta^*$ are temporary variables.

* * * * *